US008587517B2

(12) United States Patent
Perkunder (10) Patent No.: US 8,587,517 B2
(45) Date of Patent: Nov. 19, 2013

(54) INPUT DEVICE, INPUT METHOD, CORRESPONDING COMPUTER PROGRAM, AND CORRESPONDING COMPUTER-READABLE STORAGE MEDIUM

(76) Inventor: Hannes Perkunder, Berlin (DE)

( * ) Notice: Subject to any disclaimer, the term of this patent is extended or adjusted under 35 U.S.C. 154(b) by 1495 days.

(21) Appl. No.: 11/817,153

(22) PCT Filed: Mar. 1, 2006

(86) PCT No.: PCT/EP2006/060356
§ 371 (c)(1),
(2), (4) Date: Aug. 27, 2007

(87) PCT Pub. No.: WO2006/092406
PCT Pub. Date: Sep. 8, 2006

(65) Prior Publication Data
US 2008/0224995 A1    Sep. 18, 2008

(30) Foreign Application Priority Data
Mar. 4, 2005  (DE) .......................... 10 2005 011 356

(51) Int. Cl.
*G09G 5/08*    (2006.01)
(52) U.S. Cl.
USPC ........... 345/157; 345/159; 345/160; 345/161; 345/169; 345/172; 345/184; 715/856
(58) Field of Classification Search
USPC ......... 345/121, 123, 169, 124, 126, 184, 157, 345/173, 352, 161, 163, 167, 160; 200/5 A, 200/5 R, 6 A, 6 R
See application file for complete search history.

(56) References Cited

U.S. PATENT DOCUMENTS

| | | | |
|---|---|---|---|
| 5,521,617 A | 5/1996 | Imai et al. | |
| 5,714,980 A * | 2/1998 | Niino | 345/160 |

(Continued)

FOREIGN PATENT DOCUMENTS

| | | |
|---|---|---|
| DE | 19609589 A1 | 9/1997 |
| DE | 198 51 352 | 5/2000 |
| DE | 10133177 | 1/2002 |
| DE | 10245333 | 4/2004 |

(Continued)

OTHER PUBLICATIONS

Mouse Device for Inputting Direction on 2D Screen, IBM Technical Disclosure Bulletin, vol. 35, No. 4B, Sep. 1992.

*Primary Examiner* — Lun-Yi Lao
*Assistant Examiner* — Olga Merkoulova
(74) *Attorney, Agent, or Firm* — Perkins Coie LLP; Aaron Wininger (57) ABSTRACT

The invention related to an input device and an input method as well as a corresponding computer program and a corresponding computer-readable storage medium, which can be used, in particular, to very precisely change parameters in data processing programs or electric devices in conjunction with a graphic user interface (GUI). It is therefore proposed to employ an input device with a rotary controller for controlling programs via a graphic user interface of a data processing system, wherein the input device is configured to generate a signal string when the rotary controller is actuated, which causes an operating system of the data processing system to change the values of the data used for positioning a cursor on the graphic user interface so that the cursor is moved on the graphic user interface on a substantially linear curve, when the cursor is visualized according to the data used for positioning.

19 Claims, 1 Drawing Sheet

(56) References Cited

U.S. PATENT DOCUMENTS

| | | |
|---|---|---|
| 5,873,520 A | 2/1999 | Ratgeber et al. |
| 6,297,795 B1 | 10/2001 | Kato |
| 6,697,050 B1 | 2/2004 | Shinohe et al. |
| 2002/0118848 A1 | 8/2002 | Karpenstein |
| 2003/0095096 A1* | 5/2003 | Robbin et al. ............ 345/156 |
| 2004/0032395 A1* | 2/2004 | Goldenberg et al. ...... 345/156 |
| 2004/0096071 A1 | 5/2004 | Wang |
| 2004/0128064 A1 | 7/2004 | Lueer |

FOREIGN PATENT DOCUMENTS

| | | |
|---|---|---|
| EP | 0 905 645 | 3/1999 |
| EP | 1376063 | 1/2004 |
| GB | 2 313 682 | 12/1997 |
| GB | 2364763 | 2/2002 |
| JP | 04000523 | 1/1992 |
| JP | 06-301479 A | 10/1994 |
| JP | 11-327779 A | 11/1999 |
| JP | 3005991 B | 2/2000 |

* cited by examiner

INPUT DEVICE, INPUT METHOD, CORRESPONDING COMPUTER PROGRAM, AND CORRESPONDING COMPUTER-READABLE STORAGE MEDIUM

FIELD OF THE INVENTION

The invention relates to an input device in an input method as well as a corresponding computer program and a corresponding computer-readable storage medium, which can be particularly easily employed to change parameters for data processing programs or electric devices in conjunction with a graphic user interface (GUI) with high accuracy.

BACKGROUND OF THE INVENTION

A number of input devices are known for operating a graphic user interface (GUI) of a computer or (as implied in the following) of other devices that can be controlled by a GUI, primarily the so-called mouse which has established itself as a standard. Signals are generated by moving the mouse over a flat surface and are transmitted to the computer to be controlled, generating on the display a corresponding two-dimensional motion of the mouse pointer. For example, graphic control elements can be selected, activated, "held" in place, moved, etc., on the display with the mouse button(s) in a conventional manner.

Various other input devices are also known which have equal control functionality and compatibility to that of a the mouse, but operate differently. Examples are so-called trackballs, touchpads and joysticks. These input devices are implicitly included when referring hereinafter to a mouse.

So-called hardware controllers are now widely used in the area of computer-based digital audio studios. These hardware controllers control the corresponding audio software preferably via a MIDI interface and are in most cases specifically matched to that interface. Typical hardware control elements are here touch keys, rotary controllers and (motorized) slide controllers. In particular, rotary controllers have a significant advantages over a mouse for achieving continuous control, so that these are ubiquitous, for example, in mixers of computer-based audio studios. A manually generated rotation by moving a finger provides a significantly better sensory-haptic and fine-motor control of the controller than moving a mouse under the control of a person's arm motion.

The German published patent application DE 102 45 333 A1 describes an input device with a rotary controller. The input device includes a first control unit for moving a monitor, such as a cursor, on a display and a second control unit for changing parameters for controlling additional programs. In particular, both control units generate different signals, because operating the first control unit positions a marker on the display, whereas operating the second control unit does not change the position of the marker, but changes other input parameters—for example station frequencies of a car radio. Within the context of the solution described in the German published application DE 102 45 333 A1, actuating the second control unit must not produce a motion of the marker on the display, because the parameters to be changed are selected by moving the marker on the display to a defined position of the GUI. Changing the position of the marker during the operation of the second control unit may therefore cause the marker to be moved to a position of the GUI which is provided for changing a different parameter. As a result, the second parameter would then be (unintentionally) changed. In this solution, too, the control unit is adapted specifically for the application program, for example the control software of the car radio.

Also known is a scroll wheel (frequently provided as an operational control in addition to a mouse), where a thumbwheel without a limit stop preferably controls the scroll bars of a program having suitable software directly and independent of the position of the mouse pointer, as long as the corresponding program window is active.

Also known are devices with a rotary controller without a limit stop, which are connected with a computer and which use suitably configured driver software to control different parameters (e.g., the audio volume of a media player). However, the software to be controlled must support these devices. The number of parameters that can be controlled in this manner is limited in practice and the association of the parameters to be controlled with the device is rather indirect and complex.

Disadvantageously, the aforedescribed solutions either lack the rotary controller which is ergonomically advantageous as a control element for precise control of the parameters, or the programs or devices to be controlled are inflexible and depend specifically on the input devices. The conventional rotary controllers are therefore not suited for controlling anything else but the specifically adapted programs, in particular not for controlling programs which only permit parameters to be entered via a GUI by using input devices, such as a mouse, touchpad and the like.

Such programs can be controlled, for example, by showing on the GUI a slider or another graphic object which are selected in a first step by moving the cursor positioned on the GUI with the mouse over the control button of the virtual slider or over the graphic object. In a second step, the control button or graphic object are typically "held" in position by pressing and holding a mouse button (frequently the so-called "left mouse button" which will be referred to hereinafter as main selection button which is used to generate the so-called main selection signals by pressing, holding and releasing this left mouse button). In a third step, the control button or graphic object is moved by moving the mouse, and in a fourth step the control button or the graphic object is again "released". To precisely operate the virtual controller and to precisely move the graphic object, it would also be desirable for such programs to use a rotary controller instead of the conventional, but imprecise input devices, namely mouse, trackball, touchpad, joy stick, etc.

SUMMARY

It is an object of the invention to provide an input device and an input method as well as a corresponding computer program and a corresponding computer-readable storage medium, which obviates the disadvantages of the conventional solutions which more particularly provides an ergonomic input device for the GUI-supported control of programs or devices.

With the input device according to the invention with a rotary controller for controlling of programs that can be operated via a graphic user interface of a data processing system, such programs can be particularly advantageously controlled with high precision by configuring the input device in such a way that actuating the rotary controller generates a signal string which causes an operating system of the data processing system to change the values of the data used for positioning a cursor on the graphic user interface such that the cursor is moved on the graphic user interface on a substantially linear curve when the cursor is visualized with the data used for positioning. The exceptional sensory-haptic and fine-motor control of the operation of the rotary controller in conjunction with the restriction of the degrees of freedom of the cursor motion enables very precise control.

In an preferred embodiment of the input device according to the invention, the input device is designed so that signals are inserted in the signal string generated during operation of the rotary controller, in particular by a rotational actuation, which correspond to the signals generated when one or several keys of one or several input devices are pressed and held, released and/or clicked. In this way, for example, the signal string generated by the input device corresponds to a signal string which is generated when keys of a mouse, trackball, touchpad and the like are pressed, held down and released, in particular when the main selection key is pressed and released (in the following referred to as a hold signal). In this way, virtual controllers and objects are "held" on the GUI and precisely moved and/or changed during the rotary actuation of the rotary controller in only a single operating step. Additional actions and steps, such as pressing keys of other input devices, pressing the rotary controller itself and the like, are therefore eliminated. It has also proven to be advantageous if the essentially linear curve of the cursor on the graphic user interface is oriented at an angle. Because the contributions from the horizontal and perpendicular motion component can be changed simultaneously on an angled cursor curve, this approach simultaneously generates values that can be used, for example, for controlling virtual horizontal and vertical slide controllers.

The input device of the invention has another significant advantage in that this input device, if suitable graphic control elements and/or objects are available, is capable of controlling all programs which can also be controlled with a computer mouse, because the operating system does not differentiate between the input device of the invention and a computer mouse, since the input device of the invention generates exactly the same signal strings that are also generated by a computer mouse.

Advantageously (because the same input devices are simultaneously connected and control the same software functions), the input device according to the invention, the input method according to the invention and the computer program of the invention are used to coordinate the input, in particular by generating input priorities. To this end, when several input devices are used, priority values are assigned, either dynamically or statically, to at least one subset of these input devices. For example, a master priority can be statically assigned to a preferred input device, so that operation of this input device blocks input by other devices. Input priorities may advantageously also be predetermined by assigning priority to the currently actuated input device. In other situations, it may be advantageous to assign the same priority to all input devices and process their input equally, for example by cumulating the input values.

Advantageously, an input method according to the invention can be used for precisely positioning objects on the GUI, which is particularly desirable when controlling CAD programs, or for precisely adjusting parameter values. An input device with a rotary controller is employed, whereby operating the rotary controller generates a signal sequence which causes an operating system of the data processing system to change the values of the data used for positioning a cursor of a graphic user interface in such a way that the cursor is moved on the graphic user interface on an essentially linear curve, if the cursor is visualized according to the data used for positioning.

The computer program of the invention for an input method enables a data processing system, after the computer program is loaded into a memory of the data processing system, to carry out an input method for controlling programs which can be operated via a graphic user interface of a data processing system, wherein an input device with rotary controller is employed and operation of the rotary controller generates a signal sequence which causes an operating system of the data processing system to change the values of the data used for positioning a cursor on the graphic user interface such that the cursor is moved on the graphic user interface on an essentially linear curve, if the cursor is visualized according to the data used for positioning Such computer programs can be provided, for example, (for a fee or free of charge, freely accessible or password-protected) for downloading in a data or communication network. The computer programs provided in this manner can be used with a method, wherein a computer program according to claim 19 is downloaded from an electronic data network, for example from the Internet, to a data processing system connected to the data network.

To carry out the input method of the invention, a computer-readable storage medium can be used on which a program is stored which enables a data processing system, after the program is loaded into a memory of the data processing system, to carry out an input method for controlling programs that can be operated via a graphic user interface of a data processing system, wherein an input device with rotary controller is employed and operation of the rotary controller generates a signal sequence which causes an operating system of the data processing system to change the values of the data that are used for positioning a cursor on the graphic user interface such as that the cursor is moved on the graphic user interface on an essentially linear curve, if the cursor is visualized according to the data used for positioning.

The input device of the invention, the input method of the invention, as well as the computer program of the invention can therefore be easily integrated in computer systems with pre-existing input devices. They combine the ergonomic advantages of a rotary controller implemented in hardware with the universal operability of GUI-supported software with a mouse and many other corresponding programming conventions.

BRIEF DESCRIPTION OF THE DRAWING

An exemplary embodiment of the invention will now be described with reference to the figures in the drawings.

DETAILED DESCRIPTION

Before describing exemplary embodiments of the invention, several principal operating modes relevant for the input device of the invention will be described first. The input device of the invention includes at least one rotary controller which includes firmware that detects and digitizes the rotation of the controller. The signals digitized by the firmware are transmitted via an interface to a computer, on which a program to be controlled is installed, or to a device to be controlled. Advantageously, the computer uses a mouse interface for this purpose. The signals are then processed by a driver and transmitted to the operating system of the computer or device as a signal string. An operating system is a program which, after having been initially loaded by a boot loader, administers all other programs in the computer. These other programs are referred to as applications. Applications use the operating system by requesting from the operating system services via a defined interface (API—Application Program Interface). Typical tasks of an operating system are, for example:

Control of the execution of application programs,
Managing the main memory,
Controlling data input and output, and
Ensuring communication with one or several users.

Most operating systems already provide standard drivers, including standard mouse drivers, for many peripheral devices. It may also be advantageous for the input device of the invention to use a standard mouse driver or another installed driver which is specifically configured for an already connected input device. This would obviate a need for installing an additional driver. Special functions of the input device of the invention can advantageously be provided by using a driver specifically configured for the input device of the invention.

By using a mouse driver or another driver, which communicates with the operating system much like a mouse driver, the signal string transmitted by this driver to the operating system then corresponds to a signal string which is processed by the operating system to move or position a cursor on a connected display and to interact with the GUI based on signals inserted in the signal string, which corresponds to the signals generated by mouse keys. For controlling the cursor motion, this signal string includes a vertical and a horizontal component. The proportionality factor of the signal components generated by the input device of the invention is essentially constant (for an effectively constant configuration), and the generated cursor motion is therefore essentially linear, if this cursor motion is visualized on a display at all.

However, visualization of these signal strings by moving the mouse pointer is not desirable for ergonomic reasons when addressing certain graphic control elements of the GUI. For example, sometimes a function is provided which "freezes" the cursor. In this approach, the actual (internal) cursor position, i.e., the data used for positioning the cursor of the graphic user interface, is changed, whereas the displayed (visible) cursor remains at the current position. When the cursor "thaws" the current (internal) cursor position is set equal to the position of the visible cursor and the visible cursor is subsequently tracked again. In this way, the user does not see the cursor jumping around during a brief search for the mouse pointer, which may strain the user's eyes in the long run. In another limitation when visualizing the aforedescribed signal strings, the mouse pointer disappears completely on the display during the time a graphic control element is "held" so as not to obscure the control element. It will be understood that the invention can be used for controlling a GUI also without visualizing the generated signal strings.

Figure 1:
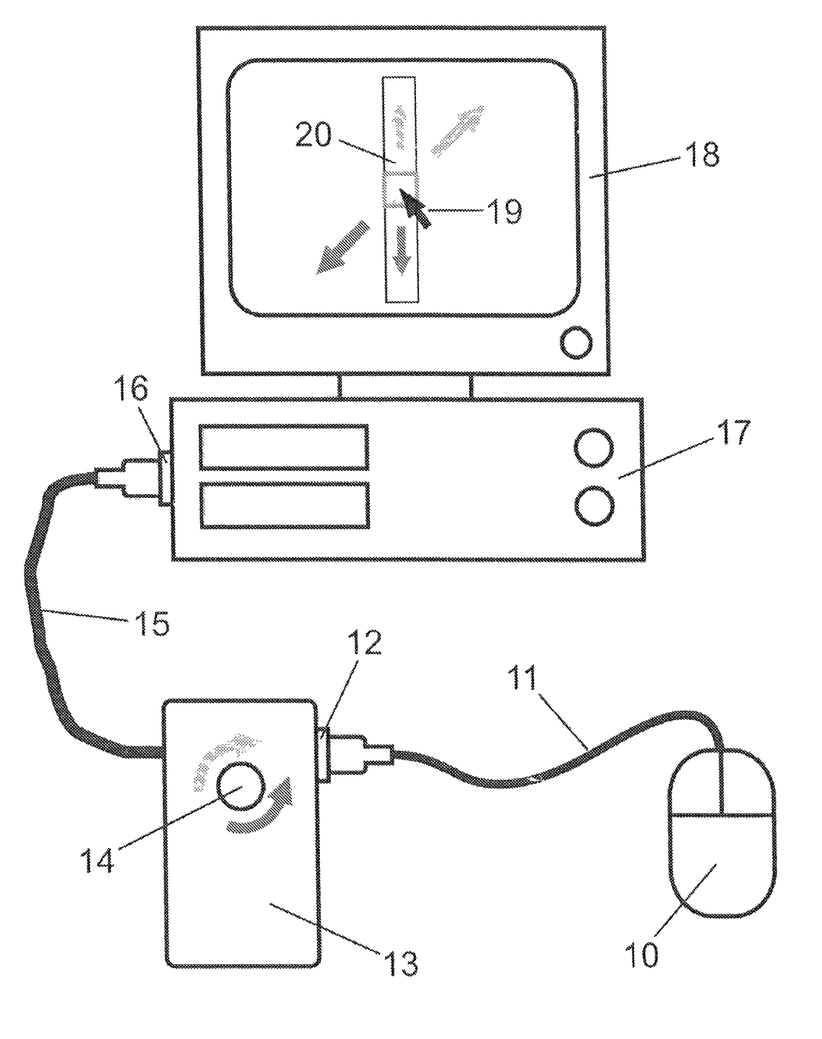
FIG. 1 shows a diagram of an exemplary application of an exemplary embodiment of the input device of the invention in conjunction with a second input device.

An exemplary embodiment of the input device of the invention will now be described in more detail. A device 13 with a rotary controller 14 that does not have a limit stop is placed on a non-skid surface of a table at the computer workstation, for example on the left side of the computer keyboard. (In the following, rotary controllers refer to all rotatable elements which can be operated by a person through direct physical contact and have a controlling effect, in particular independent of the direction of the rotation axis and of the method of operation. An embodiment with, for example, a so-called thumbwheel is also implicitly included).

A preferably conventional computer mouse is connected to the device 13 via an installed interface 12 (via cable 11 or wireless), and the device 13 itself is connected (via cable 15 or wireless) with the mouse interface 16 of the computer 17 to be controlled, so that the input device of the invention is located in the signal path between the mouse 10 and the computer 17. Because the signal path between the mouse and the computer is now longer, the input device of the invention includes a suitable amplifier for error-free transmission of the mouse signals.

In a preferred embodiment of the input device of the invention, the input device includes an optical and/or mechanical and/or electrical motion sensor which detects the motion of the rotary controller 14 or other movable elements (e.g., discs and/or other rotationally symmetric elements, toothed wheels, belts, chains, etc.) connected with the rotary controller 14 (e.g., rigidly and/or frictionally or by a toothed gear) and generates therefrom a signal string which can be used to infer information about the rotation angle, the rotation speed and the rotation direction of the rotary controller. Advantageously, mature components of computer mice (e.g., motion detection by a rotatable slotted disc which includes slit openings that pass by two light barriers or a CCD sensor (Charge-Coupled Device) typically used with optical mice) are used, which reduce development costs.

The signal string is digitized and then transmitted to a controller which processes the signal string according to the configurations of the input device of the invention (which are either pre-stored in the device 13 and recallable and/or which can be edited, stored and recalled by the user). The controller then generates the motion and/or key signals (in particular from the main selection keys) which correspond to those of the connected computer mouse, and thereafter transmits the generated signals to the mouse interface 16 of the computer 17, on which the program to be controlled is installed.

In a preferred embodiment, the input device of the invention has two functional modes:

Normal mode: the internal signal generation of the device is deactivated. All signals of the computer mouse 10 are routed through the device unchanged and control the computer as usual.

Operating mode: the signals of the mouse 10 generated by moving the mouse 10 and actuating its keys and other control elements are completely or partially filtered out and not transmitted to the computer 17. Advantageously, all other device-specific signals of the mouse 10 (for example, data relevant for so-called "Plug-and-Play") are transmitted unchanged to the computer 17 to be controlled, so that the computer 17 continues to recognize the mouse 10 as the only input device connected to the mouse interface 16. The input device of the invention generates (depending on the actual configuration) signals that correspond to those signals which the connected mouse 10 generates when it is moved or its keys are pressed, held and/or released (in particular the main selection key), and transmits those signals, instead of the filtered signals generated by the mouse 10, to the interface 16 of the computer 17 to be controlled.

Configuration mode: settings which affect signal generation and its time dependence, the signal flow, the change between the functional modes (in particular normal mode and operating mode), the compatibility of the connected devices, and changes between these configurations can be selected and stored for functional and ergonomic optimization and for adaptation to the connected mouse 10, to the computer to be controlled and to the software installed on the computer. Different editable or unchangeable stored configurations can be recalled. The computer 17 recognizes, like in the other functional modes, the connected mouse 10 as the only input device connected to the mouse interface 16.

In a preferred embodiment of the input device of the invention, the input device includes an analysis function capable of processing the ("Plug-and-Play"-relevant) data provided by the connected mouse 10 for the purpose of enabling the computer to be controlled to identify the mouse 10. After comparing these data with an updatable archive for the device types, the type of the connected mouse is identified. If the mouse cannot be identified, the input device of the invention can optionally include—in configuration mode—an additional learning function capable of analyzing motion and key signals and/or the supported data format of the connected mouse 10. Accordingly, the input device of the invention then has the required information to replace signals of the connected mouse 10 by generating the same signal type. This analysis and learning function ensures compatibility of the input device of the invention even if, for example, the signals generated by the connected mouse 10 for controlling the computer 17 cannot be uniquely converted into standard signals. Advantageously, there is no need for additional adaptation of the software, because the totality of the signals transmitted to the computer 17 to be controlled in all functional modes corresponds to the totality of the signals which are exclusively generated by the connected mouse 10.

Advantageously, the computer 17 to be controlled does not have to perform any additional tasks (compared to a mouse pointer controlled solely by the mouse 10), because the device, by filtering the corresponding mouse signals in the operating mode and by passing the signals through unchanged in the normal mode, now also manages the control priority of the mouse pointer and hence the coordination of the inputs through the mouse 10 and the input device of the invention.

The change from the normal mode to the operating mode occurs preferably by rotating the rotary controller 14. Advantageously, a corresponding visual display (e.g., LEDs of different colors) inform the user of the current functional mode (in particular the operating mode).

The operation of an exemplary embodiment of the device of the invention in a configuration particularly adapted for a computer-based audio studio will now be described in more detail, in particular with reference to graphic control elements of the GUI. However, similar other applications of the invention can be contemplated, for example video processing programs, graphic and CAD programs, virtual, hybrid or Augmented Reality, computer games or remote control of devices, for example machines used in industrial production, robots, lighting systems, climate control systems, etc.

A GUI in a computer-based audio studio typically includes graphic simulations of mixing consoles, effect devices, sound synthesizers, etc. The various parameters of these virtual devices are typically adjusted via virtual controls on the GUI. These can typically be "accessed" with the mouse pointer, "held" in position by pressing and holding the main selection key, typically referred to as the "left mouse key", and then changed by moving the mouse. The mouse pointer is decoupled again from the virtual controller when the mouse key is released. There are also parameter fields where the parameter value is entered numerically, wherein the value is also changed by "holding" the field and by moving the mouse, without visualizing a moving virtual controller on the display.

In this approach, in conjunction with the exemplary embodiment of the input device of the invention and its configuration, one convention which dominates programming of the operational control of such virtual controllers is significant: for ergonomic reasons, virtual controllers on a graphic user interface are mostly programmed so as to permit adjustment over their entire range of values by linearly moving the mouse pointer (after the controller is "held" in position by pressing and holding the main selection key). Only the component of the motion of the mouse pointer in the direction of the control motion is taken into consideration (mostly vertical or horizontal, depending on the type of virtual controller).

In those types of virtual controllers having a vertical control direction, the parameter value is typically increased by moving the mouse pointer upward and decreased by moving the mouse pointer downward. In those types of virtual controllers having a horizontal control direction, the parameter value is increased by moving the mouse pointer to the right and decreased by moving the mouse pointer to the left. Due to the convention for increasing the value of an associated function (e.g., an audio volume controller) by moving the rotary controller clockwise, a preferred configuration of the device 13 for the direction of the mouse pointer motion is obtained: turning the rotary controller 14 of the invention clockwise produces an essentially linear motion of the mouse pointer 19 from the lower left corner to the upper right corner; conversely, turning the rotary controller 14 of the invention counter-clockwise produces an essentially linear motion of the mouse pointer 19 from the upper right corner to the lower left corner.

The generated diagonal motion of the mouse pointer 19 has corresponding vector components in the vertical and horizontal directions and is therefore adapted to adjust almost all types of virtual controllers over their entire range of values.

In conjunction with the exemplary embodiment of the input device of the invention, another suitable application of the virtual controller results from the dominant programming convention, that the graphic control element continues to be "held" in position even if the mouse pointer 19 is located at an arbitrarily large distance from this "held" graphic control element.

The device 13 which is, as described above, connected in series with the mouse 10 and the computer 17 is controlled in the normal operating mode by a single element, the rotary controller 14 without a limit stop. In the illustrated exemplary embodiment, a user controls the mouse 10 with the right hand and the rotary controller 14 with the left hand.

In normal mode of the device 13, the signal of the mouse is routed unchanged through the device 13 and controls the computer 17 in a conventional manner. Operating steps, such as coarse positioning of the mouse pointer 19, changing between program windows or controlling virtual switches on the GUI can be optimally performed with the universal mouse 10.

The device 13 switches into the operating mode as soon as it detects a rotation of the rotary controller 14. It then interrupts that part of the signal flow between mouse 10 and computer 17 which controls the movement of the mouse pointer 19 and which is used for selecting graphic control elements. During the rotation, the device 13 transmits simultaneously a signal to the computer 17 which corresponds to the hold signal generated by the connected mouse when the main selection key, the left mouse key (for a PC), is pressed and held down. The additional rotation of the continuous rotary controller 14 then generates a signal which moves the mouse pointer 19 diagonally relative to the x-component (horizontal) and y-component (vertical) of the display 18, namely from the lower left corner to the upper right corner when the rotary controller 14 is turned clockwise, and in the opposite direction when the rotary controller 14 is turned counterclockwise. If a key of the mouse 10 is activated at any time, then the device 13 returns immediately to the deactivated normal mode when the mouse key is released, i.e., the device 13 transmits the mouse signals again unchanged to the computer 17. If none of the keys of the mouse controlling the computer is any longer depressed, then the "hold" signal is also released.

Various virtual types of controllers that can be represented on the GUI and their controllability with of the exemplary embodiment and the configuration of the device 13 will now be described.

1. Virtual Vertical Slide Controller 20

In normal mode, the user moves the mouse pointer 19 with the mouse 10 in a usual manner to the graphically depicted, virtual slide controller 20 and positions the mouse pointer 19 over the selection range of controller 20. When the user rotates the rotary controller 14 of the device 13, then the virtual vertical slide controller 20 moves immediately up or down depending on the rotation direction, because the slide controller 20 is immediately "grabbed" by the hold signal during the first motion of the rotary controller 14 and then "pushed" by the further motion of the rotary controller 14. In almost all situations, the software only considers the vertical component of the diagonal motion of the mouse pointer 19 generated by the device, and the virtual slide controller 20 remains under control, when the hold signal continues to be applied, even when the mouse pointer leaves the selection range of the slide controller 20.

When the control process ends, the virtual slide controller 20 is "released" again by pressing and releasing a mouse key, the device 13 simultaneously returns into the normal mode and the mouse 10 which was previously decoupled from the computer 17 by the device 13 while the device 13 was in operating mode, operates again in the usual manner.

2. Virtual Horizontal Slide Controller

The functionality corresponds here to that of the vertical virtual slide controller 20, with the difference that only the horizontal component of the motion of the mouse pointer 19 determines control of the slide controller.

3. Virtual Rotary Controller

The functionality corresponds (in most cases) for ergonomic reasons to that of the vertical virtual slide controller 20: the vertical component of the mouse pointer motion (the diagonal motion generated by the rotary controller of the device) only causes a corresponding rotation of the virtual rotary controller.

4. Graphic Areas with Numerical Parameter Values

Such virtual controllers are operated in the same manner as the virtual vertical slide controller 20 and the virtual horizontal slide controller with the difference that only the parameter value entered into the graphic field changes, without a graphic control being moved. Such areas are frequently programmed so that the mouse pointer 19 no longer moves after "holding" the area, i.e., pressing and holding the main selection key, if the mouse pointer 19 is positioned over the area, but only the value is changed when the mouse 10 is moved, i.e. the mouse pointer 19 is "frozen" until the left mouse key is released. This programming mode corresponds advantageously to the described invention, because in this case only the value is changed, without moving the mouse pointer 19 diagonally on the display. After the mouse pointer 19 is "decoupled" from the parameter area, the mouse pointer 19 is exactly at the position where it was "frozen", which aids in a quick identification of the position of the mouse pointer 19, because the user's eyes do not have to move from left to right when searching for the mouse pointer 19.

Most graphic implementations of control elements for continuously changing parameter in a computer-based audio studio fall under these types of virtual controllers. These types of controllers are frequently also used in other computer programs. One example are virtual slide controllers for adjusting color values. Scroll bars, gridlines on the time axis of audio sequencer and video processing programs can also be operated with the device 13. An essential role is played here by the horizontal and vertical motion components of the mouse pointer 19; however, graphic control elements that can only be moved diagonally are also applicable. One example in this context are the control points which are frequently employed in graphic programs for enlarging and reducing graphic objects while retaining the aspect ratio. When a suitable object is selected, these control points appear at the corners of a rectangle surrounding the object. These points can now be "held" by the mouse 10 and moved in the direction of the diagonal of the rectangle that goes through the "held" point, whereby only the motion component of the mouse pointer 19 in the direction of this diagonal is important.

The input device of the invention is also useful even if not all of the described operating characteristics of the graphic control elements are provided (or even they are not provided at all), for example for a precise rotation of objects in graphic programs. The corresponding control points can here mostly be moved in two dimensions on a circular path, whereby the motion component of the mouse pointer 19 in direction of the tangent that does through the control point of this circular path is considered. The input device of the invention is hence capable of also executing precise partial rotations.

The aforedescribed exemplary embodiment of the invention provides haptic-sensory and fine-motor control for these virtual controllers which is far superior to that achieved with a mouse 10. For normal input, the computer mouse 10 can be used in the usual manner, whereas the input device of the invention can be used for precise input. This results in an extremely efficient workflow through, on one hand, in combination achieving input priority (by decoupling the mouse signals), generating the simulated mouse key signals (pressing and holding the main selection key), as well as the simulated mouse motion signal string in a single operating step (the rotation of the rotary controller 14), and, on the other hand, returning to the normal mode simply with a mouse click without the need to change hands. A stripped-down version of the device 13 with only a single control element and an easily understandable, intuitive functionality ensures short training times. The user rarely needs to look away from the display 18 when operating the mouse 10 with one hand and the continuous rotary controller 14 with the other hand. The user is also no longer required to leave the optimal listening position in the audio studio, the so-called "sweet point", which is frequently necessary when working with mixing consoles of large hardware controllers so as to be able to operate an ergonomically advantageous controller which cannot be reached even when assuming this tightly defined position.

In addition, the device 13 advantageously also does not require additional special software for the programs to be controlled, as long as these programs can be controlled with a computer mouse 10, which is presently almost always the case. The device 13 can hence also be more universally employed than input devices specially designed for particular programs. Substantial development costs can thus be eliminated.

In the following, specific embodiments and modifications of the aforedescribed embodiments as well as other embodiments of the system of the invention and/or of the method of the invention and/or of the computer program, which are not shown in the drawings, will be described.

Basic embodiments are:

- An embodiment as a standalone device has the advantage that the device can be integrated with existing hardware setups without the need to purchase a replacement for existing hardware, such as mouse or keyboard, when using the device of the invention.
- An embodiment of a standalone device with an additional mouse or a functionally similar input device (e.g., trackball, touchpad, joystick, etc.) connected (via cable or wireless) has the advantage that the two input devices can be matched to one another, which minimizes, for example, the configuration complexity.
- Installation in other housings, such as computer keyboards, computer housings, trackball housings, joystick housings, touchpad housings, transmit and receive devices for wireless signal transmission, devices and housings for distributing, rerouting and extending signal lines of input and output devices, laptops, graphic tablets, Midi keyboards, conventional hardware controllers (audio, video), mixing consoles, monitors, printers, game consoles, and machine and system controllers, as well as in tables, chairs (armrests) and other furniture items of a computer and machine control workspace. Also feasible is installation in a mouse housing which, however, would have disadvantages compared to the defined haptic of the rotary controller due to the mobility of the mouse, unless the rotary controller is implemented as a thumbwheel.
- In a preferred embodiment, the device of the invention is housed in a computer keyboard. With modern computer interfaces for connecting input devices (e.g., USB), mouse and keyboard signals can control the computer over the same interface. It is therefore advantageous to connect a mouse to the same computer keyboard that houses the device of the invention and to connect this keyboard to a computer. Advantageously, this solution does not require significant workspace and minimizes cabling. In addition, keys actuated severally or in combination can be used for calling different configurations of the device of the invention (e.g., when actuating the SHIFT key, the cursor moves only vertically; when actuating the CTRL key, the cursor moves only horizontally; when actuating the ALT key, the cursor speed decreases; when actuating the SHIFT key in combination with the ALT key, the cursor motion becomes slower in the vertical direction, etc.).
- An embodiment, where the operating system of the computer to be controlled does not identify the device of the invention as an additional input device, and the device of the invention replaces merely signals of existing input devices with the same signal type.
- An embodiment, wherein the device of the invention provides information by firmware and transmits the information to the computer to be controlled, wherein the operating system is able to identify the device of the invention as an additional input device (preferably as mouse or a similar device), in order to search for, for example, a suitable driver.
- An embodiment wherein the device of the invention is located in the signal path between the mouse (or a functionally similar input device, see above) and the computer.
- An embodiment wherein the device of the invention is connected to the computer to be controlled in a signal path parallel to the mouse (or an input device performing a similar function, see above, which can also be built into the housing of the computer to be controlled, as is customarily, for example, with laptops).
- An embodiment wherein software adapted for the device of the invention, for example drivers or configuration programs, are additionally installed on the computer to be controlled.
- An embodiment wherein the device of the invention operates without dedicated software to be installed on the computer to be controlled and uses, for example, existing and already installed drivers and/or configuration programs.
- An embodiment wherein the input method of the invention and/or the computer program relies on at least one existing continuous rotary controller that is connected to the computer to be controlled at an arbitrary interface or is integrated in the hardware of the controller and thereby enables the computer via a corresponding driver and/or configuration software to control of the software installed on the computer according to the invention.
- An embodiment wherein the device of the invention itself coordinates inputs from a plurality of input devices (e.g., a mouse or a device of the invention) that control the mouse pointer preferably by completely or partially interrupting and/or deactivating the signal flow.
- An embodiment wherein the computer to be controlled coordinates the inputs from several input devices that control the mouse pointer.
- An embodiment wherein the device of the invention itself manages the configuration of the device of the invention with respect to editing, storage and recall and shows the configuration on suitable displays.
- An embodiment wherein the computer to be controlled manages the configuration of the device of the invention with respect to editing, storage and recall and indicates the configuration on the computer display.
- An embodiment wherein the device of the invention and the computer to be controlled manage and display the configuration of the device of the invention with respect to editing, storage and recall by task-sharing (requires a bidirectional interface, such as USB).
- An embodiment with several rotary controllers, wherein different configurations can be associated with the respective controllers and wherein their priority for controlling the software functions is uniquely assigned by the device of the invention, the input method of the invention and the computer program of the invention
- An embodiment wherein the configuration called in the operating mode depends on the position of the mouse pointer on the GUI at the time the changeover to the operating mode occurs. Different configurations (for example, relating to the pointer speed) may be associated with different graphic control elements.
- An embodiment with individually adaptable haptic-ergonomic characteristics, in particular:
  - Interchangeability of the rotary knob, so that rotary knobs of different sizes, shapes, surface structures, materials and weights can be used.
  - Adjustability of the mechanical resistance to rotation or damping of the rotation.
  - Adjustability of the angle of the rotation axis.
  - Adjustability and/or interchangeability of a hand rest, whereby different sizes, shapes, positions (heights, angles), surface materials and consistencies (e.g., hard, soft, elastic, etc.) of the hand rest can be implemented.

Adjustability of the position (heights, angles) of the entire device.

An embodiment wherein the knob of the rotary controller can be removed from or depressed into the rest of the input device of the invention, without having the rotary knob, an axle or other parts protrude significantly from the rest of the input device of the invention. In this embodiment, the input device of the invention could easily fit, for example, inside a laptop. For example, the rotary knob could be inserted in and removed from a recess in the direction of the rotation axis or could be depressed by applying pressure in the axial direction, and latched and again unlatched, and moved upward by a corresponding spring.

The method for changing into the configuration mode, changing between the individual menu points of the configuration mode, setting the respective menu points, and changing back into the normal or operating mode depends, if the input device of the invention is implemented in the input device itself (with corresponding indicators) or on (i.e., on the display of) the computer to be controlled by corresponding software. Suitable control elements are, for example, one or more additional keys/switches on the input device of the invention and its rotary controller, as well as the mouse and the computer keyboard, either severally or in combination. A corresponding learning function can support the user for configuring the signal types and the key assignment.

In configuration mode, the following settings can be completely or partially edited, stored or recalled:

1. Configuring the change from the normal mode to the operating mode:
   1.1. Immediately, as soon as a movement of the rotary controller is detected (preferred)
   1.2. Delayed, when the rotary controller has rotated by a small (optionally definable) rotation angle to minimize the risk for an unintentional change into the operating mode.
   1.3. The option of changing to the operating mode is turned off completely to prevent an unintentional switchover to the operating mode when the input device of the invention is not required.
   1.4. Activatable option which enables a change from the normal mode to the operating mode only if at least once (for a definable time) no motion of the rotary controller was detected since the last change to the operating mode, i.e., the rotary controller was at rest. This prevents the input device of the invention from suddenly and unintentionally switching back to the operating mode during a (residual) motion of the rotary controller, when changing from the operating mode to the normal mode (preferred if activated).

2. Configuring the operating mode:
   2.1. Simultaneous generation of motion signals and hold signals for virtual "holding" of, for example, virtual controllers and changing those signals in a single operating step (preferred).
   2.2. Generation of only motion signals to precisely position the mouse pointer.
   2.3. Generation of only the holding signal.
   2.4. Controller sensitivity: a proportionality factor defined as the ratio of rotation angle of the rotary controller to mouse pointer excursion, obtained from the generated motion signals (for constant rotation speed): This proportionality factor, which is frequently referred to as pointer speed, can deviate from the pointer speed desired for the mouse in a practical application of the rotary controller. It would therefore be advantageous to make the degree of the simulated mouse excursion for the same rotation angle of the rotary controller adjustable.
   2.5. Ability to change (preferably increase) the aforedescribed, previously set proportionality factor for faster movement of the rotary controller, whereby different (optionally definable) proportionality factors are assigned to different (optionally definable) speeds of the rotary controller, so that the signal strings generated by the rotary controller can be scaled depending on the rotation speed of the rotary controller This increase of the proportionality factor for fast input motion is frequently already implemented by the operating system or by a driver for mice or similar input devices. To keep the proportionality factor constant, this increase of the proportionality factor in signal processing may advantageously be compensated by a corresponding decrease of the proportionality factor during signal generation with the input device of the invention. In addition, these changes of the proportionality factor by the operating system may be prevented by choosing a driver that is specifically designed for the input device of the invention.
   2.6. Slope and directions of the substantially linear mouse pointer motion:
       2.6.1. Setting the proportionality factor of the directly proportional signal components which determine the x-component (horizontal) and the y-component (vertical) of the mouse pointer motion.
       2.6.2. Setting the function that determines, if the signal components generated when the rotary controller is moved clockwise or counterclockwise produce horizontal mouse pointer motion components from left to right or vice a versa, or produce vertical mouse pointer motion components from the bottom upward or vice a versa. This setting can be implemented by changing the mathematical sign of one or both signal components For purpose of illustration, the following examples of the settings describe the slope and the direction of the mouse pointer motion when the rotary controller is operated clockwise. When the rotary controller is operated counterclockwise, the mouse pointer motion obviously reverses direction.

Proportionality factor 1 to 0: horizontally from left to right
Proportionality factor 0 to −1: vertically from the top down
Proportionality factor 1 to 1: 45° relative to the x-axis from the lower left to the upper right (preferred).
Proportionality factor −1 to −1: 45° relative to the x-axis from the upper right to the lower left
Proportionality factor 4 to −3: about 37° relative to the x-axis from the upper left to the lower right Exemplary embodiments are the precise, exclusively horizontal or vertical displacement of graphic objects or—if a corresponding software tool is selected—precise rendering horizontal, vertical or diagonal lines in graphic and CAD programs.

A completely or partially nonlinear motion of the position pointer generated by the rotation of the rotary controller is also feasible, such as a helical or circular motion, or other movements which were previously stored either as preset values or which are editable (e.g., via a learning function), or movements consisting of several sequential linear and/or nonlinear position pointer motions (for example, for controlling particular virtual rotary controllers, initially a linear displacement from the origin followed by a circular motion, or for controlling a menu, initially a short diagonal motion for entering the selection region of the menu followed by a vertical motion for selecting the menu point).

2.7. Configuring the simulated mouse key signals, preferably the main selection signals:

Many conventional mice with several keys provide the option to configure the key assignment with corresponding software, i.e., different keys can be defined as the main selection key so that different signals can be defined as main selection signals. The input device of the invention must then also be able to generate those signals that are assigned, for example, to the "main selection" as "hold" signal so as to provide the same functionality. (A relatively frequent exemplary embodiment is the mouse key assignment for left-handed people who have greater agility in their index finger, so that the right mouse key is defined as the main selection key. This option is frequently already implemented in the operating system). It may also be advantageous to generate other key signals in addition to those associated with the "main selection." As an example, the function of calling a context menu is frequently associated with the so-called "right mouse key." The input device of the invention may advantageously have a learning function which may be used to analyze the signals from the keys of the connected mouse.

2.8. Configuring the time sequence of, in particular, several simulated mouse key signals: in addition to the preferred simulation of holding a mouse key, it may also be advantageous to generate one or more of the signals defined under 2.7 with a different time sequence immediately after switching to the operating mode. One example is here the so-called "mouse click" (pressing and releasing a key) or the so-called "double-click" (pressing and releasing a key twice). In one exemplary embodiment, a signal "press and release the right mouse key" would be generated immediately after changing to the operating mode for calling a context menu on the computer to be controlled when the mouse pointer is located at a suitable position. In this way, a vertical motion of the mouse pointer generated (set under 2.6) by an additional operation of the rotary controller would select a menu point, which would then be activated when switching back to the normal mode in response to a simultaneously transmitted signal "press and release left mouse key."

2.9. Automatic return to the normal mode when the rotary controller is not used for an extended time (the time can be defined, activatable and deactivatable).

2.10. Additional generation of computer keyboard signals: when connecting the rotary controller, for example, to a USB port, signals which are generated by computer keyboards could be sent to the computer to be controlled in addition to the mouse signals. This may be advantageous in particular when operating virtual rotary controllers, which can sometimes be adjusted over the entire range of values only by a linear mouse pointer motion by also pressing the SHIFT, CTRL, ALT key and the like on the keyboard.

3. Configuring the change from the operating mode to the normal mode:

3.1. When pressing or releasing (after that key was initially pressed) any mouse key or a specified mouse key, and/or 3.2. By moving the mouse 3.2.1. Immediately 3.2.2. Delayed, when the mouse is moved a small (optionally definable) distance so as to minimize the risk of an unintentional change to the normal mode 3.2.3. Activatable option, which permits a switchover from the operating mode to the normal mode by moving the mouse only if no mouse key is pressed or no other control element of the mouse is used. This prevents an unintentional switchover to the normal mode, for example, when only a configuration change is to be triggered by a mouse key in the operating mode and the mouse moves slightly when the corresponding mouse key is pressed, and/or 3.3. Actuating other mouse control elements (for example a thumbwheel), and/or 3.4. Switch on the input device of the invention, e.g., pushbutton switch on the rotary controller in the axial direction 3.5. Configuring the time sequence of, in particular, several simulated mouse key signals: corresponds to 2.8; however, for the change from the operating mode to the normal mode: generating mouse key signals different from the preferred exclusive "release" signal, for example pressing and releasing the left mouse key, i.e., a so-called "mouse click" signal.

3.6. Mouse pointer return function: during a diagonal motion, the mouse pointer may move far away from the controlled virtual controller observed by a user, The user must then briefly search for the mouse pointer on the display when switching from the operating mode to the normal mode, which can lead to a frequent and tiresome back-and-forth eye movement when such operations are frequently performed. This may be prevented by providing a function which stores the generated excursion of the mouse pointer from the time of the change into the operating mode and returns the mouse pointer to the normal mode by a correspondingly fast countermotion. This would minimize rapid eye movement, because the user would find the mouse pointer at the same position where it was "placed" during the switch to the operating mode. However, this additional function would have exactly the opposite effect with a virtual controller where the mouse pointer is "frozen", so that compensating for the excursion would unintentionally displace the mouse pointer. This function must therefore be deactivatable.

4. Ability to deactivate visualization of the various modes and luminous elements for minimizing optical stimuli at the workplace 5. Allocating different configuration call routines to stored overall configurations In addition to the editable overall configurations, the aforedescribed settings can also be called as part of total configurations pre-stored by the manufacturer which are not editable, or overall configurations can be provided wherein only portions of the aforedescribed settings can be edited.

The method for calling different configurations depends if the configurations are stored in the input device itself or on the computer to be controlled. Suitable control elements are, for example, one or more additional keys/switches on the input device of the invention and its rotary controller, as well as the mouse and the computer keyboard, severally or in combination. The call can also be visualized on the computer display by using suitable software. The called configuration can remain valid until another configuration is called or may deviate briefly from a standard configuration to be defined until, for example, a corresponding pressed key is released again, or until the next switchover to the normal mode.

It should be mentioned that the configuration can be changed by actuating (and possibly holding) respective associated computer keys (in particular the SHIFT, STRG, ALT and APPLE key), but also the mouse keys. For example, the left mouse key could be used in operating mode to return to the normal mode, and the right mouse key could be used to switch to a different configuration. The user would then again not have to switch hands when using only the mouse and the input device of the invention.

The embodiments of the invention are not limited to the aforedescribed preferred exemplary embodiments. Rather, a number of modifications may use the system of the invention and the method of the invention in different embodiments. In particular, other embodiments may employ existing components of the system to be controlled as hardware (in particular the continuous rotary controller), for installation in other housings, for the identification of the device by the system to be controlled, for signal generation, data transmission and interfaces, for software adaptation (in particular drivers) as well as for editing, storing and calling of configurations.

List of Reference Symbols
10 Mouse
11 Signal line mouse-device
12 Interface mouse-device
13 Device
14 Rotary controller
15 Signal line device-computer
16 Interface device-computer (mouse port)
17 Computer
18 Display
19 Mouse pointer
20 (Virtual) slide controller

The invention claimed is:

1. An input device with rotary control knob for controlling programs which can be controlled via a graphic user interface of a data processing system, wherein the input device is configured such that upon rotating the rotary control knob a signal string is generated which causes an operating system of the data processing system to change the values of data used for positioning a cursor on the graphic user interface so that the cursor is moved along an essentially linear path on the graphic user interface, when the cursor is visualized according to the data used for the positioning, and that the input device is further configured such that the essentially linear path of the cursor runs on the graphic user interface with a slant; wherein the input device is configured such that signals are inserted into the signal string generated during activation of the rotary control knob, which signals correspond to the signals produced during depression and holding, during releasing or during clicking of one or several keys of one or several input devices.

2. The input device according to claim 1, wherein the input device comprises an optical or mechanical or electrical motion sensor.

3. The input device according to claim 2, wherein the rotary control knob is moved past the motion sensor, or that the input device comprises a movable element which is arranged such that the movements of the element are detected by the motion sensor, and which is connected with the rotary control knob in such a way that the element is moved past the motion sensor by activating the rotary control knob.

4. The input device according to claim 3, wherein the movable element is shaped as a disk, a roller, or a moving belt.

5. The input device according to claim 1, wherein the input device comprises a computer program for communicating with the operating system of the data processing system.

6. The input device according to claim 5, wherein the computer program is installed on the data processing system.

7. The input device according to claim 1, wherein the input device has at least one interface to a mouse interface of the data processing system or at least one interface to a computer mouse.

8. The input device according to claim 1, wherein the input device includes several rotary control knobs or means for selecting objects displayed on the graphic user interface.

9. The input device according to claim 1, wherein the rotary control knob is implemented as a continuous rotary control knob.

10. The input device according to claim 1, wherein the input device is configured such that the signal strings are scaled according to the rotation speed of the rotary control knob.

11. The input device according to claim 1, wherein the input device is integrated in the housing of the data processing system or in the housing of peripheral devices of the data processing system.

12. An input method for controlling programs that can be operated via a graphic user interface of a data processing system, wherein an input device with a rotary control knob is used, wherein upon rotating the rotary control knob a signal string is generated, which causes an operating system of the data processing system to change the values of data used for positioning a cursor on the graphic user interface so that the cursor is moved on the graphic user interface along an essentially linear path, when the cursor is visualized according to the data used for the positioning, and that the essentially linear path of the cursor runs on the graphic user interface with a slant; wherein signals are inserted into the signal string generated during activation of the rotary control knob, which signals correspond to the signals produced during depression and holding, during releasing or during clicking of one or several keys of one or several input devices.

13. The input method according to claim 12, wherein signal strings are scaled depending on the rotation speed of the rotary control knob.

14. The input method according to claim 12, wherein when using several input devices, priority values are assigned to at least a portion of these input devices.

15. The input method according to claim 12, wherein when using several input devices, through activation of one of the input devices at least a portion of the input devices is deactivated or decoupled from the input.

16. A computer program which enables a data processing system, after the computer program has been loaded into a memory device of the data processing system, to execute an input method for controlling programs that can be operated via a graphic user interface of a data processing system, wherein an input device with a rotary control knob is used and a signal string is generated upon rotating the rotary control knob, which signal string causes an operating system of the data processing system to change the values of data used for positioning a cursor on the graphic user interface so that the cursor is moved along an essentially linear path on the graphic user interface, when the cursor is visualized according to the data used for the positioning, and that the essentially linear path of the cursor runs on the graphic user interface with a slant; wherein signals are inserted into the signal string generated during activation of the rotary control knob, which signals correspond to the signals produced during depression and holding, during releasing or during clicking of one or several keys of one or several input devices.

17. A method, wherein a computer program according to claim 16 is downloaded from an electronic data network to a data processing system connected to the data network.

18. A non-transitory computer readable storage medium, on which a program is stored which enables a data processing system, after the program has been loaded into the memory of the data processing system, to execute an input method for controlling programs that can be operated via a graphic user interface of a data processing system, wherein an input device with a rotary control knob is used and a signal string is generated upon rotating the rotary control knob, which signal string causes an operating system of the data processing system to change the values of data used for positioning a cursor on the graphic user interface so that the cursor is moved along an essentially linear path on the graphic user interface, when the cursor is visualized according to the data used for the positioning, and that the essentially linear path of the cursor runs on the graphic user interface with a slant; wherein the input device is configured such that signals are inserted into the signal string generated during activation of the rotary control knob, which signals correspond to the signals produced during depression and holding, during releasing or during clicking of one or several keys of one or several input devices.

19. An input device with rotary control knob for controlling programs which can be controlled via a graphic user interface of a data processing system, wherein the input device is configured such that upon rotating the rotary control knob a signal string is generated which causes an operating system of the data processing system to change the values of data used for positioning a cursor on the graphic user interface so that the cursor is moved along an essentially linear path on the graphic user interface, when the cursor is visualized according to the data used for the positioning, and that the input device is further configured such that the essentially linear path of the cursor runs on the graphic user interface with a slant; wherein the input device is configured such that signals are inserted into the signal string generated during activation of the rotary control knob, which signals correspond to the signals produced during depression and holding, during releasing or during clicking of one or several keys of one or several input devices, where the signal string comprises a signal component of a first degree of freedom and a signal component of a second degree of freedom, and the essentially linear path is generated by setting in proportion the signal component of the first degree of freedom to the signal component of the second degree of freedom, where the proportion is defined by a proportionality factor.

* * * * *